United States Patent [19]

Capra

[11] 4,014,129
[45] Mar. 29, 1977

[54] FISHING ROD STABILIZING HANDLE

[75] Inventor: Gerald N. Capra, Minneapolis, Minn.

[73] Assignee: Theodore Capra, New Brighton, Minn.

[22] Filed: Mar. 26, 1975

[21] Appl. No.: 562,020

[52] U.S. Cl. .................................. 43/23; 43/25
[51] Int. Cl.² .................................. A01K 87/00
[58] Field of Search ............ 43/18, 21.2, 23, 25; 128/394; 135/45, 45 A, 47.5, 47, 52

[56] References Cited

UNITED STATES PATENTS

| | | | |
|---|---|---|---|
| 1,033,668 | 7/1912 | Brunnett | 43/23 |
| 1,607,285 | 11/1926 | Krimblebine | 43/23 |
| 2,149,837 | 3/1939 | Browne | 43/23 |
| 2,244,408 | 6/1941 | Thompson | 43/25 |
| 2,737,747 | 3/1956 | Benson et al. | 43/23 |
| 3,367,056 | 2/1968 | Johnson | 43/25 |
| 3,372,510 | 3/1968 | Avsenault | 43/23 |
| 3,466,783 | 9/1969 | Priebe, Jr. | 43/23 |

Primary Examiner—Warner H. Camp
Attorney, Agent, or Firm—Merchant, Gould, Smith, Edell, Welter & Schmidt

[57] ABSTRACT

A rod stabilizing handle and attachment for spinning-type fishing rods capable of floating a fishing rod and reel combination. A stabilizing handle member configured for attachment to or at the posterior handle portion of a spinning rod includes an elongate broad upwardly directed surface for normally matingly engaging a substantial length of that forearm of the fisherman which is holding the rod. Rod stabilization forces, distributed along the length of the stabilizing handle, are uniformly transmitted from the forearm to the rod to counterbalance opposing reaction forces when reeling in an object. The handle includes flotation support in a liquid media of the fishing rod and reel combination to which it is attached.

22 Claims, 13 Drawing Figures

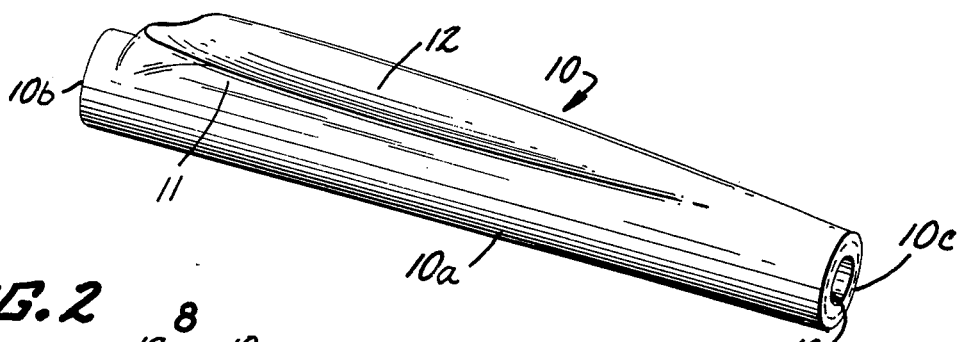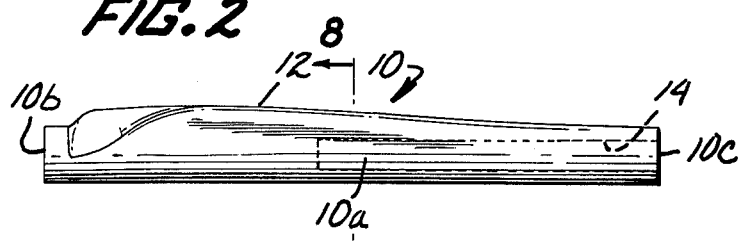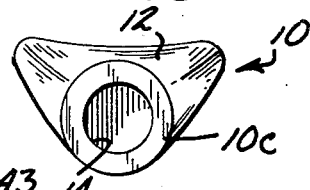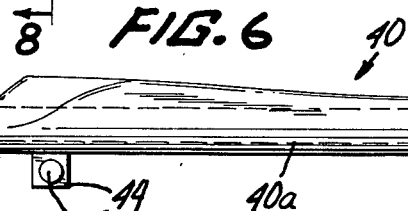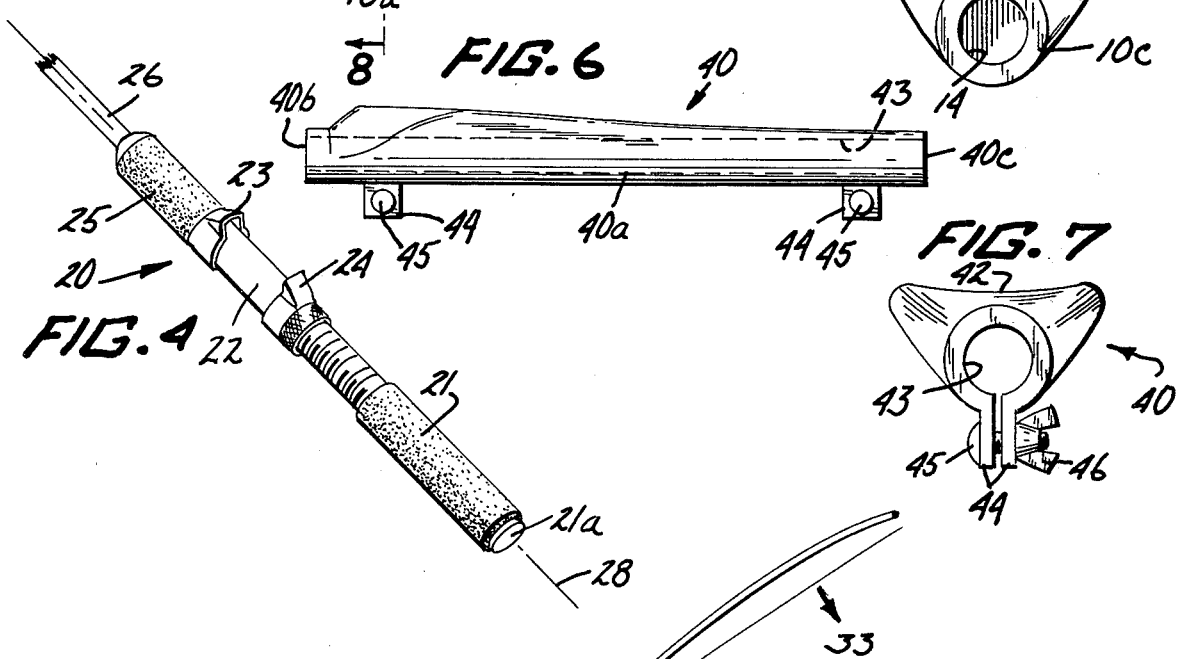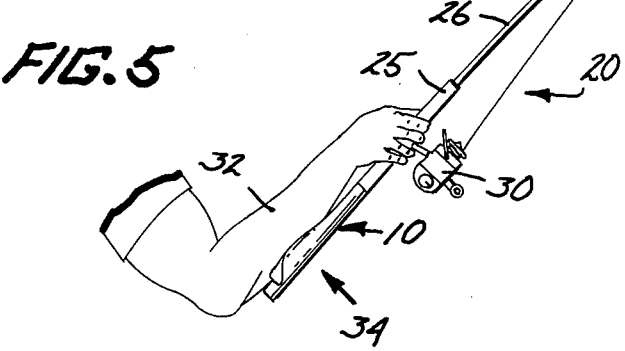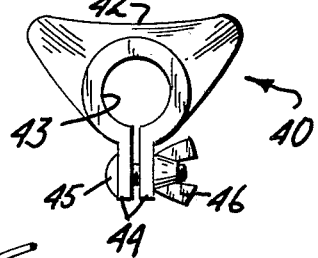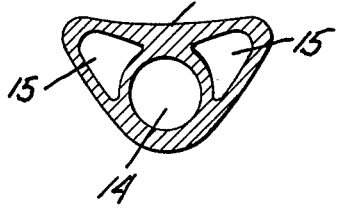

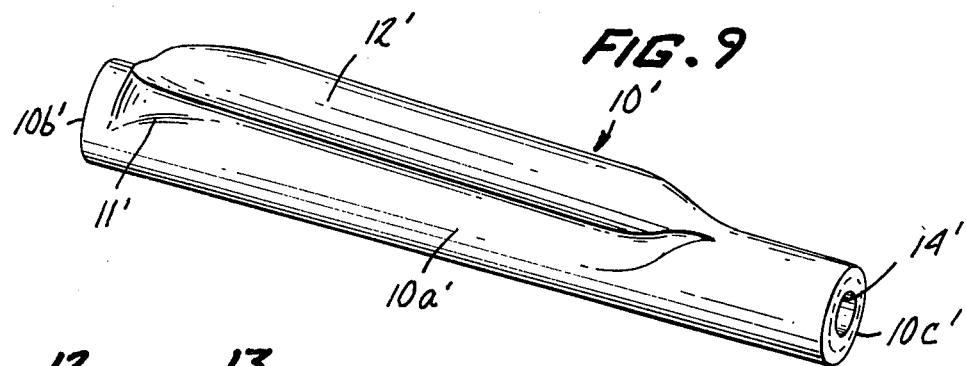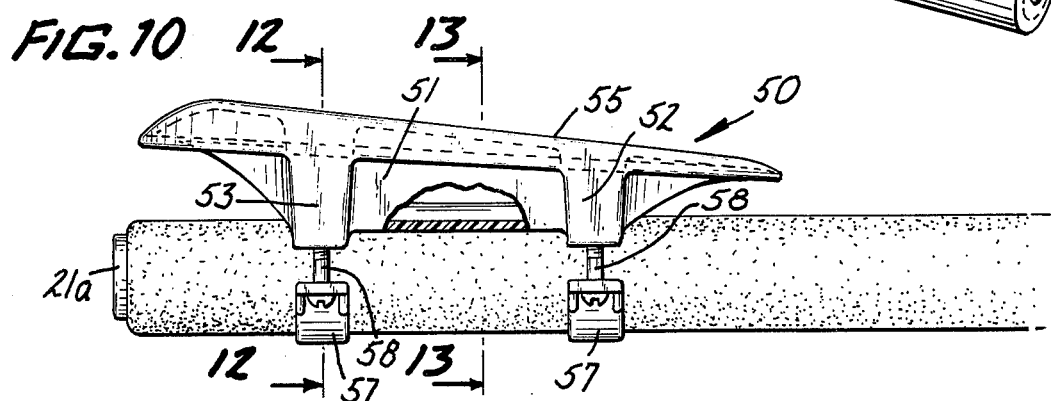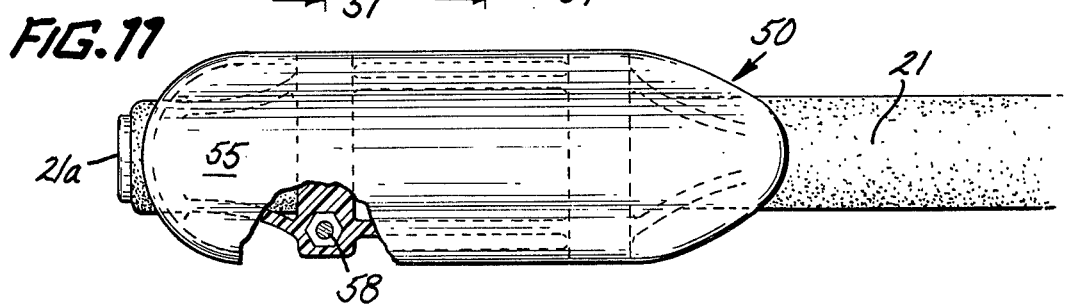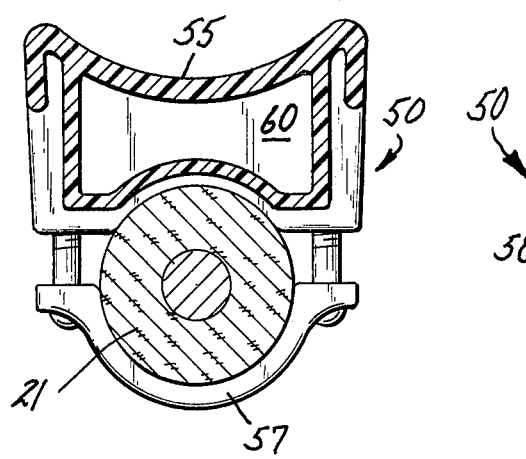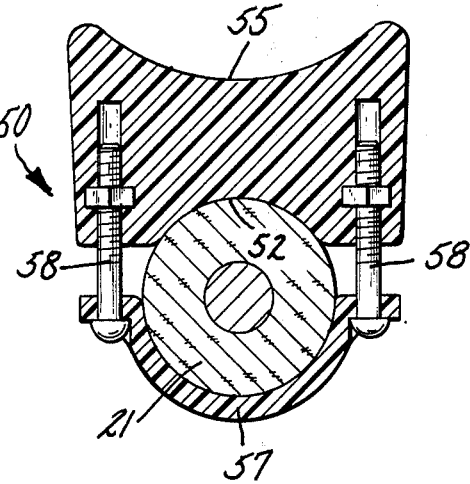

FISHING ROD STABILIZING HANDLE

BACKGROUND OF THE INVENTION

1. Field of the Invention

This invention generally relates to fishing rod handles and more particularly to a rod stabilizing flotation handle for spinning-type fishing rods.

2. Description of the Prior Art

The prior art of fishing rods abounds with rod design variations concerning primarily with the size, weight, appearance, flexibility and reliability of the fishing rod proper, but little has been done to alter the conventional design of the rod itself to directly aid the fisherman in his control of the rod when landing a fish. This is particularly true in the art of the so-called "spinning-type" or "long" fishing rod wherein the reactive forces which are transmitted through the rod to the fisherman's arm in landing a fish are significantly increased over those of a "bait casting" rod due to the relatively longer length and to the manner in which the fisherman grasps the spinning rod.

The conventional spinning rod is generally characterized by coaxially aligned segments including in successive connection: an elongate flexible rod segment, a forward hand gripping handle segment, a reel brace segment for securing a fishing reel in underlying manner to the rod, and a posterior handle segment. A fisherman, in casting with and holding the rod, grasps the rod at the forward hand gripping handle segment and generally places the posterior handle segment against the side or underside of his forearm to steady the rod when reeling in an object or when fighting a fish. With the conventional prior art spinning rod design, however, use of the posterior handle segment for its intended stabilization of the rod has been highly inefficient, requiring the fisherman to exert undue muscular effort, energy and mental attention to the stabilization and control of his rod rather than in allowing him to concentrate his energy and attention to fighting and reeling in the fish. The inefficiencies of the prior art spinning rod designs result primarily from the standard cylindrical shape of the posterior handle segment of the rod which coaxially extends rewardly from the reel mounting segment thereof. When in operative engagement with one another, the forearm of the fisherman and the posterior handle present two rounded convex surfaces to one another, urging the posterior handle to disengagingly slip sideways off of the fisherman's forearm. To prevent the slipage of the posterior handle segment from his forearm, the fisherman is required to grasp the forward handle segment of the rod with significantly increased pressure thus also exerting increased strains upon his wrist and upper arm muscles.

In addressing the stabilization problem relative spinning rods, several prior art rod stabilizing attachments have been designed. These attachments, however, have generally proved to be impractical, burdensome to use and inefficient. One such prior art stabilizing attachment comprises a wire clamp for physically strapping the posterior handle segment directly to the fisherman's forearm. While serving to steady the rod, this attachment unduly concentrates forces on a small portion of the fisherman's arm, is uncomfortable and burdensome to use and decreases the fisherman's flexibility of broad use since he must physically employ his free hand to clamp and unclamp the attachment as desired.

Other rod stabilizing attachments for spinning rods have employed forearm braces attached forward of or to the reel mounting brace segment of the rod and extending perpendicular or obliquely to the rod axis for engaging the fisherman's forearm substantially out of line with the rod axis. These devices, while tending to stabilize the rod from twisting motion, have been cumbersome to use, have placed increased streeses upon the hand and wrist portions of the fisherman's arm which is substantially obliquely aligned with the rod axis and have been uncomfortable to use due to the reactive forces from the rod being concentrated upon a small portion of the fisherman's arm.

Other rod stabilizing attachments have appeared in the prior art for specific use with "bait casting" and "fly" rods which pose different stabilization requirements from the spinning rod due to their configurations and methods of grasping and control by the fisherman. Neither these attachments nor their teachings of use can be practically or efficiently applied to the stabilization of spinning-type rods.

Another problem which has distressed fisherman for years has been the almost — certain loss of fishing rod and reel if same are accidently thrown into deep water, as for example in a lake. While fishing tackle manufacturers have recently designed fiberglas rods which have the capability of floating, none of those rods has the buoyant capacity to float both the rod and a fishing reel attached thereto. Heretofore, therefore, once a rod and reel was accidently thrown overboard, they were for all practical purposes considered lost by the fisherman.

The present invention overcomes the problems associated with prior art techniques of stabilizing a spinning rod and with floating a fishing rod and reel by use of a unique stabilizing flotation handle. While the particular configuration of the handle will be described in connection with its stabilizing use for a spinning rod, it will be understood that the flotation aspects of this invention could be applied to any type of fishing rod.

While the stabilizing handle will be described with respect to preferred embodiments of arm engaging surface designs, it will be understood that other configurations could equally well be employed within the spirit and intent of this invention. Further, while the stabilizing handle will be described both as an intrigal part of the fishing rod and as an attachment to the posterior handle segment of existing spinning rods, it will be understood that the details of securement respectively of the stabilizing handle proper and stabilizing handle attachment can be varied within the scope of this invention. It will also be understood that while representative configurations for providing the inventive flotation properties of this invention will be disclosed, these disclosures ca be replaced by alternate configurations and materials to achieve the intentions of this invention.

SUMMARY OF THE INVENTION

The present invention is particularly applicable to fishing rods of the spinning-type characterized by an elongate flexible rod portion, a forward hand gripping portion coaxial and adjacent one end of the flexible rod portion, a reel mounting portion coaxial with and adjacent the forward hand gripping portion for mounting a fishing reel in underslung manner thereto, and a posterior rod stabilizing handle rearwardly continuously extending from the reel mounting portion. The present invention provides a rod stabilizing handle which directly replaces the conventional posterior rod handle of the spinning rod or which is configured as an attachment for engagement to the conventional posterior handle. The rod stabilizing handle of this invention is characterized by a broad upwardly directed elongate surface projecting from one side of the handle for alignment with and direct engagement of a substantial length of the underside of the forearm portion of that arm of a fisherman which operatively grasps the spinning rod at the forward hand gripping portion. The hand gripping portion acts as a fulcrum for the rod in transmitting reactive forces from the forward elongate flexible portion of the rod to the posterior handle portion. The broad upwardly directed elongate surface of the stabilizing handle, in directly engaging the fisherman's forearm transmits stabilizing forces from the fisherman's forearm to the fishing rod which are distributed along the length of the posterior rod stabilizing handle to counterbalance opposing reactive forces transmitted through the rod about is fulcrum when landing a fish or reeling in an object.

In one embodiment of the invention, the arm engaging portion of the rod stabilizing handle is contoured to form an upwardly directed elongate U-shaped surface for matingly engaging a substantial length of the under and adjacent side portions of the fisherman's forearm. In another embodiment the arm engaging surface of the rod stabilizing handle is inclinded relative the longitudinal rod axis in a direction from the reel mounting portion upward toward the butt end of the stabilizing handle. A third embodiment of the invention includes a tapered arm engaging portion which narrows from a substantially elongate broadened region near the butt end of the stabilizing handle to a relatively narrower region near the reel mounting portion. Various combinations of these features are envisioned within the scope of this invention, it being common to all that a substantial length of the underside of the fisherman's forearm be engaged by the rod stabilizing handle.

The rod stabilizing handle means of this invention, including those aforementioned features, can be configured as an attachment for securement to the existing posterior handle portion of a spinning rod. The details of securement of the elongate broadened arm engaging portion of the attachment can be varied within the scope of this invention and will generally include adjustable means for enabling securement accommodation of the arm engaging support member to posterior rod handles of varied configuration and size.

Applicant's invention further encompasses a flotation handle proper or attachment thereto being configured so as to have sufficient buoyancy to float the typical fishing rod and reel attached thereto in a liquid media. One embodiment of the flotation feature of this invention includes a handle constructed of wood of sufficient size to floatingly support a rod and reel combination. In another embodiment, the flotation handle is configured to define internal cavities wich may be enclosed to form buoyant air pockets or may be filled with styrofoam or other buoyant material rendering the handle sufficiently buoyant to float a rod and reel combination.

BRIEF DESCRIPTION OF THE DRAWING

FIG. 1 is a perspective view of a preferred embodiment of an integral rod stabilizing handle of the present invention for a spinning rod;

FIG. 2 is a view in side elevation of the rod stabilizing handle disclosed in FIG. 1;

FIG. 3 is a view in end elevation of the rod stabilizing handle disclosed in FIG. 2;

FIG. 4 is a perspective view of a portion of a spinning rod of conventional design;

FIG. 5 is a diagrammatic view illustrating the operative use of the rod stabilizing handle of this invention;

FIG. 6 is a view in side elevation of one embodiment of a rod stabilizing attachment of the present invention;

FIG. 7 is a view in end elevation of the rod stabilizing attachment disclosed in FIG. 6;

FIG. 8 is a view in cross section of the rod stabilizing handle disclosed in FIG. 2, generally taken along the Line 8—8;

FIG. 9 is a perspective view of a second embodiment of a rod stabilizing handle of the present invention;

FIG. 10 is a view in side elevation, with portions thereof broken away, of a second embodiment of a rod stabilizing attachment of the present invention, illustrated as attached to the posterior handle of a spinning rod;

FIG. 11 is a top plan view of the rod stabilizing attachment disclosed in FIG. 10;

FIG. 12 is a view in cross section of the rod stabilizing handle attachment disclosed in FIG. 10, generally taken along the Line 12—12; and FIG. 13 is a view in cross section of the rod stabilizing handle attachment disclosed in FIG. 10, generally taken along the Line 13—13.

DESCRIPTION OF THE PREFERRED EMBODIMENT

Referring to the figures, wherein like numerals represent like parts throughout the several views, there is generally shown in perspective view in FIG. 1, a rod stabilizing handle 10 for a fishing rod of the spinning type. A spinning-type fishing rod of conventional design is generally illustrated at 20 in FIG. 4. The spinning rod 20 is generally characterized by successively connected rod segments including a posterior handle segment 21, a reel mounting segment 22, a forward or anterior hand gripping segment 25 and an elongate flexible rod segment 26. The plurality of rod segments which comprise the spinning-type rod 20 of conventional design are coaxially aligned about a longitudinal rod axis 28. The posterior handle segment 21 terminates at a butt end 21a at the rearmost terminus of the rod 20. The rod 20 as illustrated in FIG. 4 is shown in inverted configuration, having a pair of reel mounting clamps 23 and 24 secured to the reel mounting segment 22 for securing a fishing reel to the reel mounting portion 22. The foremost mounting clamp 23 is typically stationary and the rearward mounting claim 24 is longitudinally adjustable relative the clamp 23 to secure the mounting bracket of the fishing reel therebetween. In operative use, the spinning rod 20 is oriented as illustrated in FIG. 5 with a fishing reel 30 attached to the reel mounting segment 22 in underslung position.

Referring to FIG. 1 the rod stabilizing handle 10 is designed to replace the convention cylindrical posterior handle segment 21 (FIG. 4) of the spinning rod 20. The rod stabilizing handle 10 is characterized by an elongate lower body portion 10a, terminating at a butt end 10b (corresponding to the butt end 21a of the posterior handle segment 21 when operatively connected to the fishing rod 20), and at an oppositely disposed forward end 10c. The forward end 10c of the rod stabilizing handle 10 is configured for operative connection to the butt end of the reel mounting segment 22 of the fishing rod 20. In that embodiment of the invention illustrated in FIG. 1, the forward end 10c of the rod stabilizing handle 10 has an orifice 14 longitudinally projecting into the body portion 10a of the handle and defining an inner channel for accepting a handle mounting stud (not illustrated) rearwardly longitudinally extending from the reel mounting segment 22.

Referring to FIGS. 1 through 3, the upper portion of the rod stabilizing handle 10 is integrally raised (generally designated at 11 to form a broad upwardly directed elongate surface 12 which overlies and extends over substantially the entire length of the lower body portion 10a of the rod stabilizing handle 10. When operatively connected to the spinning-type rod 20, as illustrated in FIG. 5, the rod stabilizing handle 10 is oriented to confrontingly present its broad upwardly directed elongate surface 12 for aligned engagement with the underside of the forearm portion 32 of that arm of a fisherman which operatively grasps the rod 20 at the anterior hand gripping segment 25 thereof.

In that embodiment of the invention illustrated in FIGS. 1 through 3, the integrally raised portion 11 of the rod stabilizing handle 10 is configured to shape the elongate surface 12 into an upwardly directed U-shaped surface for matingly engaging a substantial length of the under and adjacent side portions of the forearm 32. In the embodiment of the invention illustrated in FIGS. 1 through 3 the upwardly directed surface 12 is further tapered from an elongate broadened portion near the butt end 10b of the handle 10 toward a substantially narrower width near the forward end 10c of the handle 10 to matingly accommodate the natural taper of the forearm 32 from elbow to wrist. In the embodiment illustrated in FIGS. 1 through 3 the upper raised portion 11 of the rod stabilizing handle 10 is also configured to incline the upwardly directed surface 12 in an upward direction when progressing from the forward end 10c of the handle 10 toward its butt end 10b.

A second embodiment of an integral rod handle for a spinning rod is illustrated in perspective at 10' in FIG. 9. Those segments of the rod handle 10' which correspond to like portions of the handle 10 of FIG. 1 have been primed in FIG. 9. The rod stabilizing handle 10' illustrated in FIG. 9 features a non-tapering elongate broadened U-shaped arm engaging surface 12' which is upwardly inclined from the forward end 10c' toward the butt end 10b' of the handle 10'.

While the embodiments of integral rod stabilizing handles disclosed in FIGS. 1 and 9 illustrate certain combinations of desirable features for such a handle, it will be recognized that other variations which employ a broad elongate arm engaging surface fall within the spirit and intent of this invention.

One embodiment of a rod stabilizing attachment for spinning rods which employs the principles of this invention is illustrated at 40 in FIG. 6 and 7. The rod stabilizing attachment 40 has an elongate lower body portion 40a defining an internal channel 43 extending therethrough from a butt end 40b to a forward end 40c of the attachment 40. The lower body portion 40a is separated along its lower surface to provide adjustment of the size of the inner channel 43 to accommodate posterior rod handles 21 of varied diameters. The rod stabilizing attachment 40 is configured for direct overlying attachment to the posterior handle 21 of a spinning rod 20, with the posterior handle segment 21 of the rod filling the inner channel 43 of the attachment 40. Two pairs of downwardly depending tabs 44 disposed near opposite ends of the attachment 40 accommodate a pair of bolts 45 and associated wing nuts 46 for securing the rod stabilizing attachment 42 to the posterior handle segment 21 of the spinning rod 20.

The upper portion of the rod stabilizing attachment 40 is raised and configured to form a broad upwardly directed elongate surface 42 for alignment with and direct engagement of a substantial length of the underside of the forearm 32 when the rod stabilizing 40 is operatively connected to the spinning 20.

A second embodiment of a rod stabilizing attachment for operative securement to the posterior handle segment 21 of a spinning rod is generally illustrated at 50 in FIGS. 10 – 13. The rod stabilizing attachment 50 generally comprises an upper portion 51 configured for resting engagement upon a pair of mounting portions 52 and 53 sized to engage the upper surface of the posterior rod segment 21. The upper portion 51 of the attachment 50 is configured to form a broad elongate upwardly directed arm engaging surface 55 which is generally U-shaped in the embodiment illustrated to matingly engage a substantial length of the under and adjacent side arm portions of the forearm 32. In the embodiment illustrated in FIGS. 10 through 13, the upper portion 51 is configured to slightly incline the upper arm engaging surface 55 upwardly from the reel mounting segment 22 of the rod 20 toward the butt end 21a of the posterior handle segment. A pair of mounting clamps 57 are contoured to embrace the lower surface of the posterior handle 21, one each of the mounting clamps being disposed opposite the upper mounting portion 52 and 53 of the attachment 50 to secure the upper portion 51 of the attachment 52 to the posterior handle 21 by means of a plurality of bolts generally designated at 58. The bolts 58 are threaded into accommodating means within the upper portion 51 of the attachment 50 to provide adjustable mounting accommodation for the attachment 50 to posterior handles 21 having varied dimensions.

Each of the handles disclosed in the drawing is configured to have sufficient buoyancy to floatably support the fishing rod 20 and an attached fishing reel 30. The buoyancy feature may be provided by constructing the handle entirely out of wood and by sizing the handle sufficiently large to floatably support a rod and reel combination.

A second embodiment of providing a flotation handle is to configure the handle to contain internal cavities which may be filled with air, gas or a highly buoyant solid material such as styrofoam. A cross sectional view of the rod stabilizing handle 10 which is configured to include two internal air pocket cavities is illustrated in FIG. 8. Referring to FIG. 8, the internal flotation cavities of the handle 10 are generally designated at 15 and are of sufficient size to floatably support a rod and reel combination. When using internal cavities to provide the flotation support, the rod handle could be constructed of such material as fiberglass, aluminum and the like.

The internal flotation cavity feature can equally well be employed to the rod stabilizing attachments 40 and 50, as illustrated in FIG. 13 by the internal cavity 60 defined by the outer walls of the upper portion 51 of the rod stabilizing attachment 50.

OPERATION OF THE PREFERRED EMBODIMENT

The rod stabilizing handle and rod stabilizing attachments for connection to the posterior handle portion 21 of a spinning rod 20 are operatively employed in identical manner. The rod stabilizing handle 10 is illustrated in FIG. 5 as it would be operatively employed when integrally connected to a spinning rod 20. The stabilizing handle 10 as connected is oriented such that the upwardly directed elongate surface 12 thereof is directed toward the opposite side of the rod 20 from which the fishing reel 30 is mounted. The fisherman's hand normally grasps the rod 20 at the anterior hand gripping segment 25, providing a fulcrum thereat for pivotal motion thereabout. A downward pulling force, for example when landing or fighting a fish, generally designated at 33 creates a reactionary upward force 34 about the fulcrum point, urging the rod stabilizing handle 10 toward the forearm 32 of the fisherman. The broad upwardly directed arm engaging surface 12 matingly engages the lower and adjacent side surfaces of the forearm 32 providing distributed stabilizing forces therealong for stabilizing the rod against the reaction forces. The broadened U-shaped surface 12 prevents the rod stabilizing handle 10 from slipping sideways off of the forearm 32, and provides uniform comfortable engagement with the forearm 32 which significantly reduces the amount of gripping force required by the fisherman to maintain the rod 20 in a stabilized attitude.

Should for any reason the rod and reel fall overboard within deep water, the flotation means configured within the the handle will floatingly support a rod and reel of standard construction until they can be retrived by the fisherman.

Other modifications of the invention will be apparent to those skilled in the art in light of the foregoing description. The description is intended to provide concrete examples of individual embodiments clearly disclosing the present invention. Accordingly, the invention is not limited to any particular embodiment. All alternatives, modifications and variations of the present invention which fall within the spirit and broad scope of the appended claims are covered.

What is claimed is:

1. In combination with a spinning-type fishing rod having an elongate flexible rod portion, a forward hand gripping portion coaxial with and adjacent one end of said flexible rod portion, and a reel mounting portion coaxial with and adjacent said forward hand gripping portion for mounting a fishing reel in underslung manner thereto, a posterior rod stabilizing handle rearwardly continuously extending from said reel mounting portion and characterized by a broad upwardly directed elongate surface for alignment with and direct engagement of a substantial length of the underside of the forearm portion of that arm of a fisherman which operatively grasps said fishing rod at said forward hand gripping portion to provide stabilizing forces to said fishing rod which forces are distributed along the length of said posterior rod stabilizing handle to counterbalance opposing forces transmitted through said rod when landing a fish or reeling in an object, said elongate upper surface being disposed relative said rod so as to lie in a generally horizontal plane when said rod is horizontally operatively positioned and tapering from a substantially elongate broadened region near the butt end of said rod stabilizing handle to a relatively narrower region near said reel mounting portion for matingly accommodating the natural taper of the width of said forearm in the direction from elbow to wrist thereof.

2. The combination as recited in claim 1, wherein said rod stabilizing handle is further characterized by said broad upwardly directed surface thereof being contoured to form an upwardly directed elongate U-shaped surface for matingly engaging a substantial length of the under and adjacent side portions of said forearm.

3. In combination with a spinning-type fishing rod having an elongate flexible rod portion, a forward hand gripping portion coaxial with and adjacent one end of said flexible rod portion, and a reel mounting portion coaxial with and adjacent said forward hand gripping portion for mounting a fishing reel in underslung manner thereto, a posterior rod stabilizing handle rearwardly continuously extending from said reel mounting portion and characterized by a broad upwardly directed elongate surface for alignment with and direct engagement of a substantial length of the underside of the forearm portion of that arm of a fisherman which operatively grasps said fishing rod at said foreward hand gripping portion to provide stabilizing forces to said fishing rod which forces are distributed along the length of said posterior rod stabilizing handle to counterbalance opposing forces transmitted through said rod when landing a fish or reeling in a object, wherein said posterior rod stabilizing handle comprises:
  a. an elongate body portion coaxial with said reel mounting portion and continuously rearwardly extending therefrom to a butt end for general alignment with said forearm portion of said arm operatively grasping said fishing rod at said forward hand gripping portion; and
  b. a raised broadened extension integral with and overlying substantially the length of said elongate body portion, said extension defining said broad upwardly directed elongate surface for engaging a substantial length of the underside of said forearm.

4. The combination as recited in claim 3, wherein said rod stabilizing handle is further characterized by said raised broadened extension being inclined relative said underlying elongate body portion in a direction from said reel mounting portion upward toward said butt end of said stabilizing handle.

5. The combination as recited in claim 4, wherein said rod stabilizing handle is further characterized by said broad upwardly directed elongate surface thereof being contoured to form an upwardly directed elongate U-shaped surface for matingly engaging a substantial length of the under and adjacent side portions of said forearm.

6. The combination as recited in claim 5, wherein said rod stabilizing handle is further characterized by the width of said contoured surface being tapered from a substantially elongated broadened region near the butt end of the rod stabilizing handle and narrowing toward said reel mounting portion for respectively matingly accommodating the contoured natural taper of the width of said forearm in the direction from elbow to wrist thereof.

7. A rod stabilizing handle for a spinning-type fishing rod of the type having a plurality of rod segments operatively coaxially connected about a longitudinal rod axis, said segments successively comprising an elongate flexible rod, an anterior hand gripping handle defining a fulcrum for pivotal rod motion thereabout when operatively grasped by a hand of a fisherman, a reel mounting brace for securing a fishing reel in underslung manner to said rod, and mounting means operatively connected at the butt end of said mounting brace for mounting said rod stabilizing handle thereto; said rod stabilizing handle comprising;

a. an elongate lower body portion having connecting means adjacent one end thereof configured to matingly engage said mounting means for operatively securing said rod stabilizing handle to said reel mounting brace, said body portion when so secured forming a rearwardly extending continuation of said reel mounting brace segment; and b. an arm engaging portion overlying and forming an integral continuous raised projection of said lower body portion having an upwardly directed broadened surface sized to engage a substantial length of the underside of that forearm connected to said hand which operatively grasps the rod at said gripping handle fulcrum; said arm engaging portion when engaging said forearm operative to transmit rod stabilizing forces from said forearm to said rod, said stabilizing forces being distributed along the length of said arm engaging portion and in a direction about said fulcrum to counterbalance opposing forces caused during landing of a fish or reeling in an object.

8. A rod stabilizing handle as recited in claim 7, wherein the upwardly directed broadened surface of said arm engaging portion is contoured to form an upwardly directed elongate U-shaped surface for matingly engaging a substantial length of the under and adjacent side portions of said forearm.

9. A rod stabilizing handle as recited in claim 7, wherein said rod stabilizing handle is further characterized by the upper broadened surface of said arm engaging portion being inclined relative said underlying lower body portion in a direction from said reel mounting brace segment upward toward the butt end of said rod stabilizing handle.

10. A rod stabilizing handle as recited in claim 9, wherein said connecting means of said lower body portion of said rod stabilizing handle and said mounting means of said fishing rod cooperatively matingly engage to cause said lower body portion to coaxially extend with said rod axis rearwardly from said reel mounting brace segment.

11. A rod stabilizing handle as recited in claim 7, wherein said connecting means of said rod stabilizing handle and said mounting means of said fishing rod cooperatively matingly engage to cause said lower body portion to coaxially extend with said rod axis rearwardly from said reel mounting brace segment.

12. A rod stabilizing handle as recited in claim 11, wherein said mounting means of said fishing rod comprises a mounting member projecting rearwardly from the butt end of said reel mounting brace segment, and wherein said connecting means is further characterized by the anterior end of said lower body portion of said rod stabilizing handle being shaped to form an inwardly extending channel sized to matingly cooperatively engage said mounting member for operatively securing said rod stabilizing handle to said reel mounting brace.

13. A rod stabilizing handle as recited in claim 11, wherein the upwardly directed broadened surface of said arm engaging portion is contoured to form an upwardly directed elongate U-shaped surface for matingly engaging a substantial length of the under and adjacent side portions of said forearm.

14. A rod stabilizing handle as recited in claim 13, wherein said rod stabilizing handle is further characterized by the upper broadened surface of said arm engaging portion being inclined relative said rod axis in a direction from said reel mounting brace upward toward the butt end of said rod stabilizing handle.

15. A rod stabilizing handle as recited in claim 14, wherein said lower body portion of the rod stabilizing handle is generally cylindrically disposed about said rod axis.

16. A rod stabilizing handle as recited in claim 14, wherein the width of said broad upwardly directed surface of said arm engaging portion of the rod stabilizing handle tapers from an elongate, substantially broadened region near the butt end of said rod stabilizing handle to a relatively narrower region near said reel mounting brace segment for matingly accommodating the natural taper of the width of said forearm in the direction from elbow to wrist thereof.

17. A rod stabilizing handle as recited in claim 7, wherein said rod stabilizing handle includes flotation means giving said rod stabilizing handle sufficient buoyancy for floatably supporting in a liquid media said fishing rod and a fishing reel operatively attached to said reel mounting brace segment thereof.

18. An improved spinning-type fishing rod having a plurality of rod segments successively coaxially connected along a longitudinally extending rod axis; comprising;

a. an elongate flexible rod segment extending along said rod axis;

b. an anterior hand gripping handle segment coaxial with said rod axis and connected adjacent one end of said flexible rod segment, said anterior hand gripping segment defining a fulcrum for pivotal rod motion of said rod axis thereabout when operatively grasped by a hand of a fisherman;

c. a reel mounting brace segment coaxial with said rod axis and connected adjacent one end of said anterior hand gripping handle segment for securing a fishing reel in underslung disposition relative the operative disposition of said rod thereto; and d. a posterior rod stabilizing handle coaxial with said rod axis connected to the butt end of said reel mounting brace segment and continuously extending rearwardly therefrom, said rod stabilizing handle configured to define a broad upwardly directed arm engaging elongate surface inclined relative said rod axis in a direction from said reel mounting brace segment upward toward the butt end of said rod stabilizing handle for operative aignment with and direct engagement of a substantial length of the underside of that forearm connected to said hand which operatively grasps said anterior hand gripping portion, said arm engaging surface, when in engagement with said forearm operative to transmit rod stabilizing forces distributed along the length of said stabilizing handle to said rod for counterbalancing about said fulcrum opposing forces caused during landing of a fish or reeling in of an object.

19. An improved spinning-type fishing rod having a plurality of rod segments successively coaxially connected along a longitudinally extending rod axis; comprising:

a. an elongate flexible rod segment extending along said rod axis;

b. an anterior hand gripping handle segment coaxial with said rod axis and connected adjacent one end of said flexible rod segment, said anterior hand gripping segment defining a fulcrum for pivotal rod motion of said rod axis thereabout when operatively grasped by a hand of a fisherman, said pivotal rod motion normally being substantially in a generally vertical plane;

c. a reel mounting brace segment coaxial with said rod axis and connected adjacent one end of said anterior hand gripping handle segment for securing a fishing reel in underslung disposition relative the operative disposition of said rod thereto; and d. a posterior rod stabilizing handle coaxial with said rod axis connected to the butt end of said reel mounting brace segment and continuously extending rearwardly therefrom, said rod stabilizing handle configured to define a broad upwardly directed arm engaging elongate surface for operative alignment with and direct engagement of a substantial length of the underside of that forearm connected to said hand which operatively grasps said anterior hand gripping portion, said arm engaging surface, when in engagement with said forearm operative to transmit rod stabilizing forces distributed along the length of said stabilizing handle to said rod for counterbalancing about said fulcrum opposing forces caused during landing of a fish or reeling in of an object, wherein said elongate arm engaging surface is disposed substantially in a plane lying generally perpendicular to said vertical rod motion plane and said elongate arm engaging surface being tapered from an elongate substantially broadened region near the butt end of said rod stabilizing handle to a relatively narrower region near said reel mounting brace segment for matingly accommodating the natural taper of the width of said forearm in the direction from elbow to wrist thereof.

20. An improved spinning-type fishing rod having a plurality of rod segments successively coaxially connected along a longitudinally extending rod axis, comprising:

a. an elongate flexible rod segment extending along said rod axis;

b. an anterior hand gripping handle segment coaxial with said rod axis and connected adjacent one end of said flexible rod segment, said anterior hand gripping segment defining a fulcrum for pivotal rod motion of said rod axis thereabout when operatively grasped by a hand of a fisherman;

c. a reel mounting brace segment coaxial with said rod axis and connected adjacent one end of said anterior hand gripping handle segment for securing a fishing reel in underslung disposition relative the operative disposition of said rod thereto; and d. a posterior rod stabilizing handle coaxial with said rod axis connected to the butt end of said reel mounting brace segment and continuously extending rearwardly therefrom, said rod stabilizing handle configured to define a broad upwardly directed arm engaging elongate surface for operative alignment with and direct engagement of a substantial length of the underside of that forearm connected to said hand which operatively grasps said anterior hand gripping portion, said arm engaging surface, when in engagement with said forearm operative to transmit rod stabilizing forces distributed along the length of said stabilizing handle to said rod for counterbalancing about said fulcrum opposing forces caused during landing of a fish or reeling in of an object, said posterior rod stabilizing handle comprising:

i. an elongate generally cylindrical lower body portion coaxially extending with said rod axis; and ii. an arm engaging portion overlying and forming an integral continuous raised projection of said lower body portion, said raised projection terminating at said broad upwardly directed arm engaging surface.

21. An improved spinning-type fishing rod as recited in claim 20, wherein said upwardly directed broadened surface of said arm engaging portion of said rod stabilizing handle is contoured to form an upwardly directed elongate U-shaped surface for matingly engaging a substantial length of the under and adjacent side portions of said forearm.

22. An improved spinning-type fishing rod as recited in claim 21, wherein said arm engaging portion of said rod stabilizing handle is configured to incline said upper U-shaped surface thereof relative said rod axis in a direction from said reel mounting brace segment upward toward the butt end of said rod stabilizing handle.

* * * * *